United States Patent
Ueda

(10) Patent No.: US 9,212,806 B2
(45) Date of Patent: Dec. 15, 2015

(54) LUMINANCE ADJUSTMENT FILM AND ILLUMINATING DEVICE INCLUDING A PHOTOISOMERIZABLE COMPOUND

(71) Applicant: Empire Technology Development LLC, Wilmington, DE (US)

(72) Inventor: Masahiro Ueda, Kyoto (JP)

(73) Assignee: Empire Technology Development LLC, Wilmington, DC (US)

(*) Notice: Subject to any disclaimer, the term of this patent is extended or adjusted under 35 U.S.C. 154(b) by 0 days.

(21) Appl. No.: 13/979,994

(22) PCT Filed: Dec. 5, 2012

(86) PCT No.: PCT/JP2012/007809
§ 371 (c)(1),
(2) Date: Jul. 16, 2013

(87) PCT Pub. No.: WO2014/087455
PCT Pub. Date: Jun. 12, 2014

(65) Prior Publication Data
US 2015/0285468 A1    Oct. 8, 2015

(51) Int. Cl.
*F21V 1/00* (2006.01)
*F21V 14/00* (2006.01)
*F21Y 113/00* (2006.01)
*F21Y 101/02* (2006.01)

(52) U.S. Cl.
CPC ............ *F21V 14/00* (2013.01); *F21Y 2101/02* (2013.01); *F21Y 2113/002* (2013.01)

(58) Field of Classification Search
CPC  F21V 14/00; F21Y 2113/002; F21Y 2101/02
See application file for complete search history.

(56) References Cited

U.S. PATENT DOCUMENTS

| | | | |
|---|---|---|---|
| 7,935,396 B2 | 5/2011 | Matsumori et al. | |
| 7,965,370 B2 | 6/2011 | Matsumori et al. | |
| 2007/0160778 A1* | 7/2007 | Matsumori et al. | 428/1.2 |
| 2009/0104412 A1 | 4/2009 | Han et al. | |
| 2010/0103335 A1 | 4/2010 | Bastiaansen et al. | |

FOREIGN PATENT DOCUMENTS

| | | |
|---|---|---|
| CN | 101414021 | 10/2008 |
| EP | 2 136 998 | 9/2008 |
| JP | 2003-330228 | 11/2003 |
| JP | 2009-098695 | 5/2009 |
| JP | 2010-521010 | 6/2010 |
| KR | 10-2009-0039218 | 4/2009 |

OTHER PUBLICATIONS http://www.scas.co.jp/company/news/27/talk_27.pdf, 2013 Sunika Chemical Analysis Service, [retrieved from internet on Mar. 14, 2013], 1 page.

(Continued)

*Primary Examiner* — Mary Ellen Bowman
(74) *Attorney, Agent, or Firm* — Knobbe Martens Olson & Bear, LLP

(57) ABSTRACT

Luminance adjustment films that include at least one microcapsule containing at least one photoisomerizable compound which selectively decreases luminance of visible light in reaction to ultraviolet light having an intensity distribution which reflects a luminance distribution of the visible light are described.

24 Claims, 2 Drawing Sheets

(56) References Cited

OTHER PUBLICATIONS http://www.jmk.ynu.ac.jp/gakugai/YNUpatent/19-10.pdf, Publication No. JP 2009-62477.

http://www.chemitech.co.jp/capsule/index.html, Chemitech, Inc., [retrieved from internet Mar. 14, 2013], 2 pages.

International Search Report and Written Opinion, International Appln. No. PCT/JP2012/007809, filed Dec. 5, 2012, date of mailing Feb. 26, 2013, 5 pages.

* cited by examiner

LUMINANCE ADJUSTMENT FILM AND ILLUMINATING DEVICE INCLUDING A PHOTOISOMERIZABLE COMPOUND

CROSS-REFERENCE TO RELATED APPLICATIONS

This application is the U.S. National Phase under 35 U.S.C. §371 of International Application No. PCT/JP2012/007809, filed Dec. 5, 2012, the contents of which are herein incorporated by reference in its entirety.

BACKGROUND

Laser emitting diodes have come into widespread usage as a result of their advantages, which include their small size, long life, low energy consumption, and low heat generation. Set against this background, there are high expectations for illuminating devices, such as those using laser emitting diodes capable of emitting visible light having a uniform luminance distribution throughout a large display area. However, conventional illuminating devices are not necessarily satisfactory due to their unevenness in luminance distribution.

SUMMARY

Figure 1:
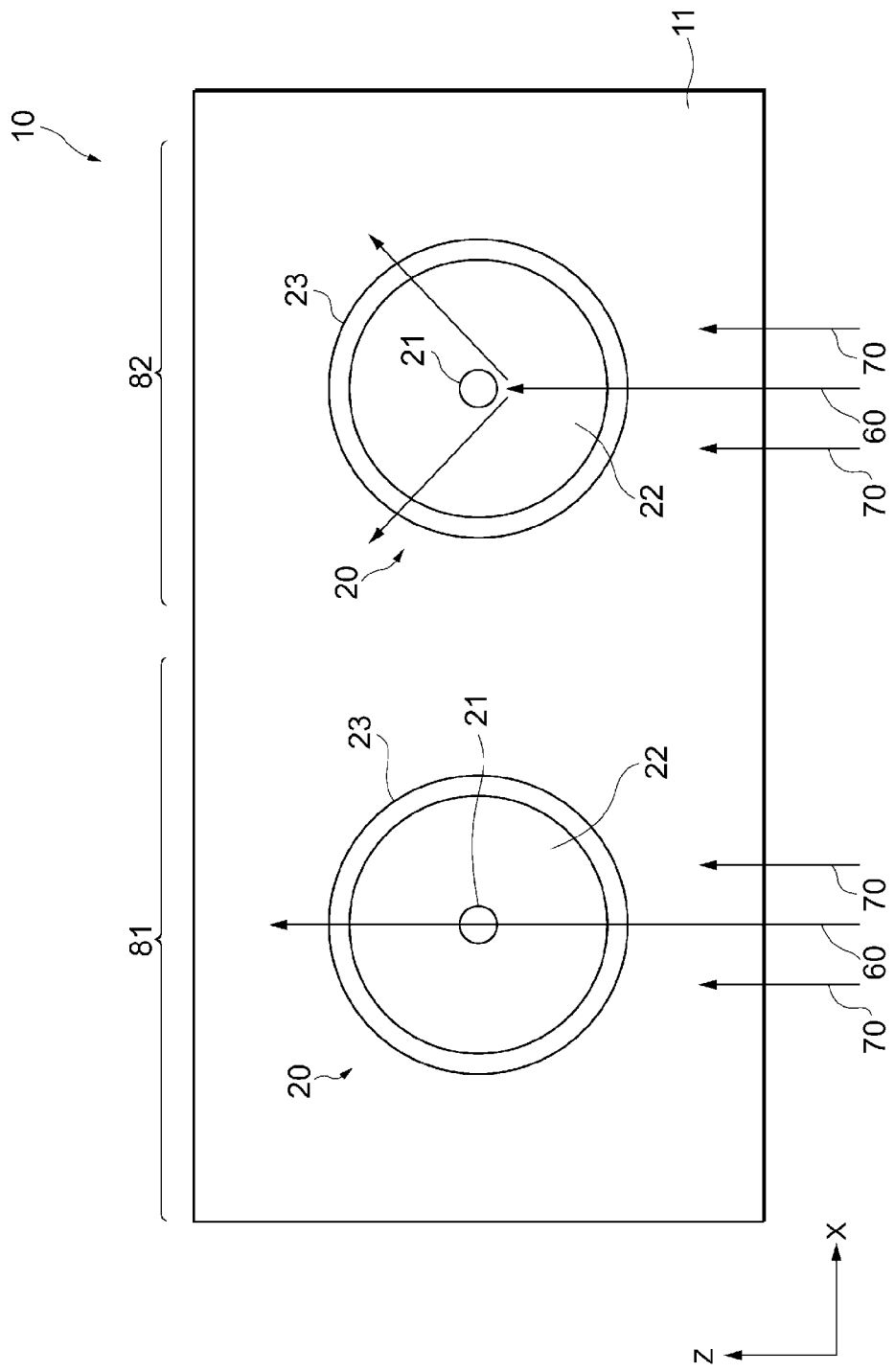
FIG. 1 shows a schematic view of a luminance adjustment film in accordance with an embodiment of the present disclosure.

In one aspect, a luminance adjustment film is described comprising: at least one microcapsule containing a photoisomerizable compound which selectively decreases luminance of visible light in reaction to ultraviolet light having an intensity distribution which reflects a luminance distribution of the visible light.

In a second aspect, an illuminating device is described comprising: a visible light source configured to emit visible light; an ultraviolet light source configured to emit ultraviolet light having an intensity distribution which reflects a luminance distribution of the visible light; and a luminance adjustment film including at least one microcapsule containing a photoisomerizable compound which selectively decreases luminance of the visible light in reaction to the ultraviolet light.

In an additional aspect, a method of manufacturing a luminance adjustment film is described, the method comprising: providing at least one microcapsule containing a photoisomerizable compound to selectively decrease luminance of visible light in reaction to ultraviolet light having an intensity distribution which reflects a luminance distribution of the visible light; providing a transparent resin; and combining the at least one microcapsule with the transparent resin to produce the luminance adjustment film.

In yet an additional aspect, a method of manufacturing an illuminating device, the method comprising: providing a visible light source configured to emit visible light; providing an ultraviolet light source configured to emit ultraviolet light having an intensity distribution which reflects a luminance distribution of the visible light; providing at least one microcapsule containing a photoisomerizable compound which selectively decreases luminance of the visible light in reaction to the ultraviolet light; providing a transparent resin; combining the at least one microcapsule with the transparent resin to produce a luminance adjustment film; and combining the luminance adjustment film with the visible light source and the ultraviolet light source to produce the illuminating device.

In a further aspect, a method of adjusting luminance is described, the method comprising: emitting visible light from a visible light source; emitting ultraviolet light from an ultraviolet light source, the ultraviolet light having an intensity distribution which reflects a luminance distribution of the visible light; and selectively decreasing luminance of the visible light in reaction to the ultraviolet light by using a photoisomerizable compound.

DETAILED DESCRIPTION

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Luminance adjustment films and methods for their preparation and use are disclosed herein. The luminance adjustment films are effective to correct any unevenness in the intensity of visible light impacting on or passing through the luminance adjustment films. Various embodiments use separate coincident ultraviolet light and visible light along with compounds that are photoisomerizable to form a precipitate that effects scattering of visible light when its intensity is undesirably high, but allowing transmission when the intensity is at an acceptable level, thereby resulting in a more even intensity across the film.

FIG. 1 shows a schematic view of a luminance adjustment film 10 in accordance with an embodiment of the present disclosure. In FIG. 1, an X-axis is perpendicular to a thickness direction of the luminance adjustment film 10, and a Z-axis is parallel to the thickness direction of the luminance adjustment film 10.

The luminance adjustment film 10 can include at least one transparent resin 11. The transparent resin 11 can be substantially or fully transparent to visible light 60. The transparent resin 11 can be substantially or fully transparent to ultraviolet light 70. The luminance adjustment film 10 can include at least one or a plurality of microcapsules 20 containing at least a first photoisomerizable compound 21. The microcapsule 20 can further include at least one solvent 22. Ultraviolet light 70 can photoisomerize the photoisomerizable compound 21. Once the ultraviolet light 70 photoisomerizes the photoisomerizable compound 21, the compound can precipitate and cause the microcapsules 20 become cloudy, scattering any visible light 60, thereby correcting any unevenness in the intensity of the visible light 60.

In some embodiments, visible light 60 and ultraviolet light 70 are substantially or fully directed coincident on the luminance adjustment film 10. The intensity of the ultraviolet light 70 can be correlated with the intensity of the visible light 60, such that a more intense ultraviolet light 70 can be directed with a more intense visible light 60. Use of only visible light 60 may not always allow absorption of energy by the photoisomerizable compound 21. By using separate ultraviolet light 70 and visible light 60 inputs, design of an effective system for correcting any unevenness in the intensity of the visible light 60 is greatly facilitated.

An advantage of using the ultraviolet light 70 is that it does not adversely affect images when used in combination with the visible light 60. The wavelength of the ultraviolet light 70 may be about 100 nanometers to about 400 nanometers, a range which does not promote any deterioration in materials such as the photoisomerizable compound 21, the solvent 22, and the transparent resin 11.

A maximum intensity of the ultraviolet light 70 may be determined according to the following procedure. When not being irradiated with the ultraviolet light 70, the photoisomerizable compound 21 is dissolved as a trans-form in the solvent 22 contained in the microcapsule 20. After starting to irradiate the photoisomerizable compound 21, being in a trans-form, with ultraviolet light 70, and then gradually increasing the ultraviolet intensity, the maximum ultraviolet irradiation intensity immediately before the photoisomerizable compound 21 begins to precipitate as a cis-form at regions in which the luminance distribution 61 of the visible light 60 is uniform can be determined. This way, at the region 82 where the intensity of the ultraviolet light 70 is greater than or equal to the certain intensity, the photoisomerizable compound 21 precipitates as a cis-form and then scatters the visible light 60 to correct unevenness in the luminance distribution 61 of the visible light 60.

The transparent resin 11 can generally be any resin substantially or fully transparent to visible light 60 and ultraviolet light 70. Specific examples of resins include polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, triacetyl cellulose, and combinations thereof. In some cases, the transparent resin 11 can have a refractive index that is similar or identical to the refractive index of the microcapsule 20.

The luminance adjustment film 10 can include at least one microcapsule 20 containing a first photoisomerizable compound 21. In some embodiments, the luminance adjustment film can include a plurality of the same microcapsule 20. The microcapsules 20 can be distributed evenly or unevenly throughout the luminance adjustment film 10. Uneven distributions can be random, gradient, or other distributions. In some embodiments, the luminance adjustment film can include two or more different microcapsules 20. In some embodiments, the luminance adjustment film 10 can include 2, 3, 4, 5, 6, or more different microcapsules 20 (20A, 20B, 20C, 20D, and so on). Each microcapsule can include one or more photoisomerizable compounds 21. Two or more photoisomerizable compounds 21 can photoisomerize at the same or different intensity or wavelength of ultraviolet light 70. For example, a microcapsule 20 can include a first photoisomerizable compound 21A and a second photoisomerizable compound 21B. Alternatively or additionally, different microcapsules can include different photoisomerizable compounds (21A, 21B, 21C, 21D, and so on). For example, a first microcapsule 20A can include a first photoisomerizable compound 21A having a first intensity or wavelength $IW_A$, and a second microcapsule 20B can include a second photoisomerizable compound 21B having a second intensity or wavelength $IW_B$. The first intensity or wavelength $IW_A$ and the second intensity or wavelength $IW_B$ can be the same or different. Typically, the various wavelengths will be different. In a more complex example, a first microcapsule 20A can include a first photoisomerizable compound 21A having a first intensity or wavelength $IW_A$, a second microcapsule 20B can include a second photoisomerizable compound 21B having a second intensity or wavelength $IW_B$, a third microcapsule 20C can include a third photoisomerizable compound 21C having a third intensity or wavelength $IW_C$, and so on.

Photoisomerizable compounds 21 can be selected such that their various isomerization intensities or wavelengths IW are spaced apart. For example, in a system containing four different compounds 21A-21D, $IW_A$ can be a lowest intensity, $IW_B$ can be an intermediate intensity, $IW_C$ can be a high intensity, and $IW_D$ can be a highest intensity. In this example, when the microcapsule 20 is exposed to the lowest intensity $IW_A$ of ultraviolet light 70, the photoisomerizable compound 21A photoisomerizes and precipitates in the microcapsule 20, whereas the remaining compounds 21B, 21C, and 21D remain unchanged. Also, when the microcapsule 20 is exposed to intermediate intensity $IW_B$ of ultraviolet light 70, both compounds 21A and 21B photoisomerize and precipitate in the microcapsule 20, whereas the remaining compounds 21C and 21D remain unchanged. The extent of the turbidity increases or decreases substantially in proportion to the number of the compounds 21A, 21B, 21C, and 21D precipitated in the microcapsule 20. This allows the microcapsule 20 to gradually decrease the luminance of the visible light 60 so as to correct unevenness in the luminance distribution 61 of the visible light 60.

The photoisomerizable compound 21 can have a first isomer form that is soluble, and a second isomer form that is insoluble. In some cases, the two isomer forms can be cis- and trans-isomer forms. Alternatively, the photoisomerizable compound 21 can have a first isomer form that is a liquid form and a second isomer form that is a solid form. Specific examples of photoisomerizable compounds 21 include a stilbene compound, stilbene, a spiropyran compound, spiropyran, azobenzene, or derivatives thereof.

The microcapsule 20 can be made of generally any one or more materials suitable for containing the one or more photoisomerizable compounds. The material can be substantially or fully transparent to visible light. The microcapsule 20 can be substantially or fully transparent to visible light 60 when below the intensity or wavelength of any photoisomerizable compound(s) contained therein while in their first isomer form, but can be translucent or opaque to visible light 60 at or above the intensity or wavelength of any photoisomerizable compound(s) 21 contained therein while in their second isomer form, thereby scattering any incident visible light. The materials may be mechanically tough, may chemically prevent a solution contained therein from leaking and may be dissolvable in a plastic resin. Examples of the materials include polycondensation resins, such as a melamine resin, a urea resin, a gelatin resin, a urethane resin, and a polyurea resin.

The microcapsule 20 can include a capsular surface 23 defining the outer surface of the microcapsule. The microcapsule 20 can further include at least one solvent 22. The solvent 22 can generally be any solvent suitable to dissolve the photoisomerizable compound when in its first isomer form below its intensity or wavelength. The solvent 22 substantially or fully does not dissolve the photoisomerizable compound when in its second isomer form at or above its intensity or wavelength. Example solvents 22 include water, high-boiling solvents, such as dimethylformamide, N-methylpyrrolidone, glycerin, polypropylene glycol, polyethyleneglycol, and combinations thereof. The solvent preferably does not leak or diffuse out of the microcapsule 20 or through the capsular surface 23.

The microcapsules 20 can be present in the luminance adjustment film 10 at generally any concentration. For example, a ratio of the plurality of microcapsules 20 to the luminance adjustment film 10 may be about 0.1% to about 90% by weight. Alternatively, the ratio of the plurality of microcapsules 20 to the luminance adjustment film 10 may be from about 5% to about 20% by weight.

The luminance adjustment film 10 can generally have any thickness. For example, the thickness can be about 1 micrometer to about 1 centimeter. Alternatively, the thickness can be about 5 micrometers to about 200 micrometers. Specific examples of thicknesses include about 1 micrometer, about 5 micrometers, about 10 micrometers, about 100 micrometers, about 200 micrometers, about 500 micrometers, about 1 millimeter, about 10 millimeters, and ranges between any two of these values (including endpoints).

The area of the luminance adjustment film 10 may, generally, be unlimited. Depending on the particular end use, for example, in the case where the luminance adjustment film 10 is used for a domestic display, an area of the luminance adjustment film 10 may be from about 1 square centimeter to about 25,000 square centimeters. Alternatively, the area can be about 100 square centimeters to about 5,000 square centimeters. Specific examples of area include about 1 square centimeter, about 10 square centimeters, about 100 square centimeters, about 1,000 square centimeters, about 2,000 square centimeters, about 3,000 square centimeters, about 4,000 square centimeters, about 5,000 square centimeters, about 10,000 square centimeters, about 15,000 square centimeters, about 20,000 square centimeters, about 25,000 square centimeters, and ranges between any two of these values (including endpoints).

The shape of the luminance adjustment film 10 can generally be any shape. The shape can be regular or irregular. Regular shapes include squares, rectangles, triangles, hexagons, pentagons, octagons, circles, ovals, and so on.

Figure 2:
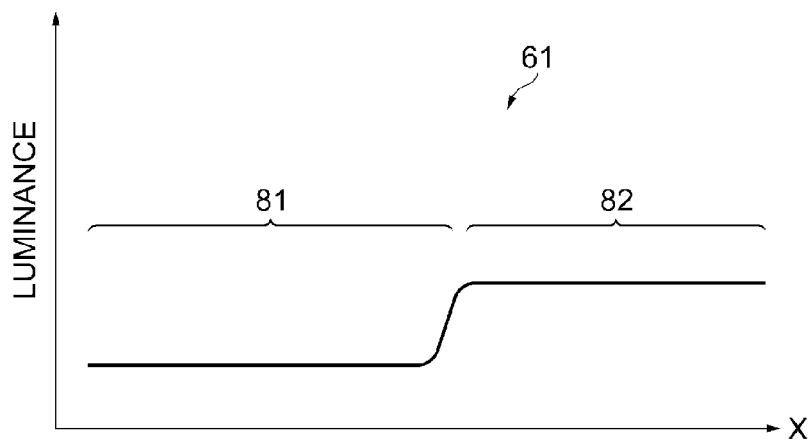
FIG. 2 shows a luminance distribution of visible light in accordance with an embodiment of the present disclosure.
Figure 3:
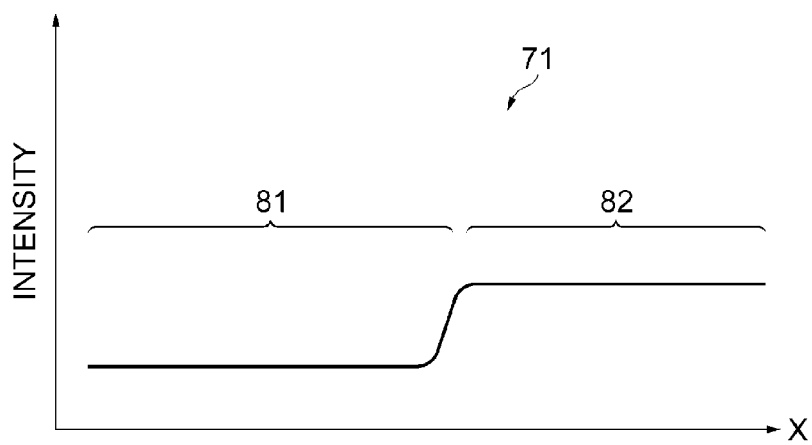
FIG. 3 shows an intensity distribution of ultraviolet light in accordance with an embodiment of the present disclosure.

FIG. 2 shows a luminance distribution 61 of the visible light 60. FIG. 3 shows an intensity distribution 71 of the ultraviolet light 70. As shown in FIGS. 2 and 3, the intensity distribution 71 may reflect the luminance distribution 61. In other words, the intensity of the ultraviolet light 70 may increase or decrease substantially in proportion to the luminance of the visible light 60.

Due to the intensity distribution 71 reflecting the luminance distribution 61, when a luminance of the visible light 60 entering a region 82 of the luminance adjustment film 10 is greater than a luminance of the visible light 60 entering a region 81 of the luminance adjustment film 10, an intensity of the ultraviolet light 70 entering the region 82 of the luminance adjustment film 10 is greater than an intensity of the ultraviolet light 70 entering the region 81 of the luminance adjustment film 10.

When the intensity of the ultraviolet light 70 entering the region 82 is greater than or equal to a certain intensity at which the photoisomerizable compound 21 begins to be precipitated in the microcapsule 20 in reaction to the ultraviolet light 70, the photoisomerizable compound 21 precipitated in the microcapsule 20 located at the region 82 selectively scatters the visible light 60 entering the region 82 so as to selectively decrease its luminance.

On the other hand, when the intensity of the ultraviolet light 70 entering the region 81 is less than the certain intensity at which the photoisomerizable compound 21 begins to be precipitated in the microcapsule 20 in reaction to the ultraviolet light 70, the visible light 60 entering the region 81 passes through the photoisomerizable compound 21 in the microcapsule 20 located at the region 81.

This way, depending on a difference in the luminance of the visible light 60 between the regions 81 and 82, the photoisomerizable compound 21 selectively decreases the luminance of the visible light 60 entering the region 82 so as to correct any unevenness in the luminance distribution 61 of the visible light 60 through the photoisomerization reaction with the ultraviolet light 70.

Figure 4:
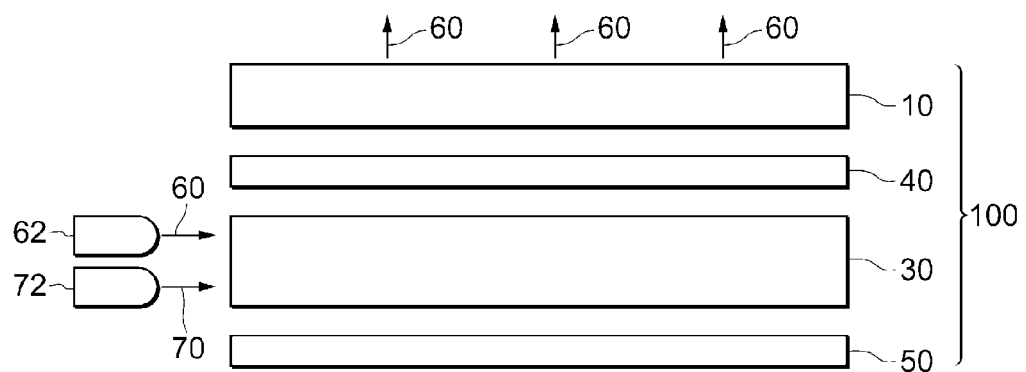
FIG. 4 shows a schematic view of an illuminating device in accordance with an embodiment of the present disclosure.

FIG. 4 shows a schematic view of an illuminating device 100 in accordance with an embodiment of the present disclosure. The illuminating device 100 may be provided with a visible light source 62 configured to emit the visible light 60, an ultraviolet light source 72 configured to emit the ultraviolet light 70, and the luminance adjustment film 10. The visible light source 62 and the ultraviolet light source 72 may be closely apposed so that the ultraviolet light source 72 can emit the ultraviolet light 70 having the intensity distribution 71 which reflects the luminance distribution 61 of the visible light 60. The visible light source 62 may be an LED light source configured to emit the visible light 60.

The illuminating device 100 may further be provided with one or more of a light guide plate 30, a scattering plate 40, and a reflective plate 50. The light guide plate 30 may be arranged to guide the visible light 60 and the ultraviolet light 70 toward the luminance adjustment film 10. The visible light source 62 and the ultraviolet light source 72 may be arranged to face one side of the light guide plate 30. The scattering plate 40 may be arranged to scatter the visible light 60 so as to bring about the uniformity of the luminance distribution 61 of the visible light 60. The scattering plate 40 may be arranged between the luminance adjustment film 10 and the light guide plate 30. The reflective plate 50 may be arranged to reflect the visible light 60 and the ultraviolet light 70 toward the luminance adjustment film 10. The reflective plate 50 may be arranged to receive the visible light 60 and the ultraviolet light 70 propagating from the light guide plate 30 in the opposite direction to the luminance adjustment film 10.

Additional embodiments include methods of manufacturing a luminance adjustment film is described, the method including: providing at least one microcapsule containing a photoisomerizable compound to selectively decrease luminance of visible light in reaction to ultraviolet light having an intensity distribution which reflects a luminance distribution of the visible light; providing a transparent resin; and combining the at least one microcapsule with the transparent resin to produce the luminance adjustment film.

Additional embodiments include methods of manufacturing an illuminating device, the method including: providing a visible light source configured to emit visible light; providing an ultraviolet light source configured to emit ultraviolet light having an intensity distribution which reflects a luminance distribution of the visible light; providing at least one microcapsule containing a photoisomerizable compound which selectively decreases luminance of the visible light in reaction to the ultraviolet light; providing a transparent resin; combining the at least one microcapsule with the transparent resin to produce a luminance adjustment film; and combining the luminance adjustment film with the visible light source and the ultraviolet light source to produce the illuminating device.

Additional embodiments include methods of adjusting luminance is described, the method including: emitting visible light from a visible light source; emitting ultraviolet light from an ultraviolet light source, the ultraviolet light having an intensity distribution which reflects a luminance distribution of the visible light; and selectively decreasing luminance of the visible light in reaction to the ultraviolet light by using a photoisomerizable compound.

EXAMPLES

Example 1

Manufacturing a Luminance Adjustment Film

Using azobenzene and polypropylene glycol as the photoisomerizable compound 21 and the solvent 22 respectively, the concentration of azobenzene was adjusted to 33% by weight. After this, an interfacial polycondensation process was applied using a urea resin as the capsular surface 23, and a plurality of microcapsules 20 were manufactured. Next, using a dissolved polycarbonate resin as the transparent resin 11, the plurality of microcapsules 20 were uniformly dispersed in the transparent resin 11, and then the transparent resin 11 was dried to produce the luminance adjustment film 10. The ratio of the plurality of microcapsules 20 to the luminance adjustment film 10 was adjusted to about 5% to about 10% by weight.

Example 2

Scattering Visible Light

Using a high-pressure mercury vapor lamp with a radiation intensity of 40 W/cm$^2$, the ultraviolet light 70 was provided from the mercury vapor lamp to the luminance adjustment film 10 manufactured through Example 1. Also, using an LED light source as the visible light source 62, the visible light 60 was provided to the luminance adjustment film 10. About one minute after being irradiated, the photoisomerizable compounds 21 began to precipitate in the microcapsule 20, and then scattered the visible light 60 to correct unevenness in the luminance distribution 61 of the visible light 60. The photoisomerizable compounds 21 precipitated in the microcapsule 20 behaved as if they were one particle.

Example 3

Ratio of Microcapsules to Luminance Adjustment Film

Using azobenzene and a polyethylene resin as the photoisomerizable compound 21 and the transparent resin 11 respectively, the luminance adjustment film 10 having a thickness of 50 micrometers was manufactured such that the ratio of microcapsules 20 to the luminance adjustment film 10 was adjusted to 1% by weight. This luminance adjustment film 10 showed a decrease of about 5% in the transmittance of visible light 60 having a wavelength of 500 nanometers or less. When the ratio of microcapsules 20 to the luminance adjustment film 10 is adjusted to 5% by weight, the concentration of the azobenzene in the solvent 22 can be increased to 20% by weight while preventing the transmittance of visible light 60 from decreasing to about 95% or less.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:

1. A luminance adjustment film comprising:
at least one microcapsule containing a photoisomerizable compound which selectively decreases luminance of visible light in reaction to ultraviolet light having an intensity distribution which reflects a luminance distribution of the visible light.

2. The luminance adjustment film of claim 1, wherein the photoisomerizable compound selectively decreases the luminance of the visible light so as to correct unevenness in the luminance distribution of the visible light.

3. The luminance adjustment film of claim 1, wherein the photoisomerizable compound selectively scatters the visible light so as to selectively decrease the luminance of the visible light when an intensity of the ultraviolet light is greater than or equal to a certain intensity.

4. The luminance adjustment film of claim 3, wherein the photoisomerizable compound is precipitated in the at least one microcapsule so as to selectively scatter the visible light.

5. The luminance adjustment film of claim 1, wherein the visible light passes through the photoisomerizable compound when an intensity of the ultraviolet light is less than a certain intensity.

6. The luminance adjustment film of claim 1, wherein the at least one microcapsule is coated with a polycondensation resin.

7. The luminance adjustment film of claim 6, wherein the polycondensation resin is formed of a melamine resin, a urea resin, a gelatin resin, a urethane resin, or a polyurea resin.

8. The luminance adjustment film of claim 1, further comprising a transparent resin in which the at least one microcapsule is contained.

9. The luminance adjustment film of claim 8, wherein the transparent resin comprises polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, or triacetyl cellulose.

10. The luminance adjustment film of claim 1, wherein the at least one microcapsule contains a solvent in which the photoisomerizable compound is dissolved.

11. The luminance adjustment film of claim 10, wherein the solvent comprises dimethylformamide, N-methylpyrrolidone, glycerin, polypropylene glycol, or polyethyleneglycol.

12. The luminance adjustment film of claim 1, wherein the photoisomerizable compound comprises an azobenzene compound, a stilbene compound, a spiropyran compound, or derivatives thereof.

13. The luminance adjustment film of claim 1, wherein the ultraviolet light has a wavelength to cause a photoisomerization reaction with the photoisomerizable compound.

14. The luminance adjustment film of claim 13, wherein the wavelength is from about 100 nanometers to about 400 nanometers.

15. The luminance adjustment film of claim 1, wherein the at least one microcapsule comprises a plurality of microcapsules uniformly distributed in the luminance adjustment film.

16. The luminance adjustment film of claim 15, wherein a ratio of the plurality of microcapsules to the luminance adjustment film is from about 0.1% to about 90% by weight.

17. The luminance adjustment film of claim 1, wherein a thickness of the luminance adjustment film is from about 1 micrometer to about 1 centimeter.

18. The luminance adjustment film of claim 1, wherein an area of the luminance adjustment film is from about 25 square centimeters to about 25,000 square centimeters.

19. An illuminating device comprising:
a visible light source configured to emit visible light;
an ultraviolet light source configured to emit ultraviolet light having an intensity distribution which reflects a luminance distribution of the visible light; and
a luminance adjustment film including at least one microcapsule containing a photoisomerizable compound which selectively decreases luminance of the visible light in reaction to the ultraviolet light.

20. The illuminating device of claim 19, wherein the visible light source comprises an LED light source.

21. The illuminating device of claim 19, wherein a maximum intensity of the ultraviolet light is determined so as to prevent the photoisomerizable compound from selectively decreasing the luminance of the visible light in a region where the luminance distribution of the visible light is uniform.

22. A method of manufacturing a luminance adjustment film, the method comprising:
providing at least one microcapsule containing a photoisomerizable compound to selectively decrease luminance of visible light in reaction to ultraviolet light having an intensity distribution which reflects a luminance distribution of the visible light;
providing a transparent resin; and
combining the at least one microcapsule with the transparent resin to produce the luminance adjustment film.

23. A method of manufacturing an illuminating device, the method comprising:
providing a visible light source configured to emit visible light;
providing an ultraviolet light source configured to emit ultraviolet light having an intensity distribution which reflects a luminance distribution of the visible light;
providing at least one microcapsule containing a photoisomerizable compound which selectively decreases luminance of the visible light in reaction to the ultraviolet light;
providing a transparent resin;
combining the at least one microcapsule with the transparent resin to produce a luminance adjustment film; and
combining the luminance adjustment film with the visible light source and the ultraviolet light source to produce the illuminating device.

24. A method of adjusting luminance, the method comprising:
emitting visible light from a visible light source;
emitting ultraviolet light from an ultraviolet light source, the ultraviolet light having an intensity distribution which reflects a luminance distribution of the visible light; and
selectively decreasing luminance of the visible light in reaction to the ultraviolet light by using a photoisomerizable compound.

* * * * *

UNITED STATES PATENT AND TRADEMARK OFFICE
CERTIFICATE OF CORRECTION

| | | |
|---|---|---|
| PATENT NO. | : 9,212,806 B2 | Page 1 of 1 |
| APPLICATION NO. | : 13/979994 | |
| DATED | : December 15, 2015 | |
| INVENTOR(S) | : Ueda | |

It is certified that error appears in the above-identified patent and that said Letters Patent is hereby corrected as shown below:

On the Title Page, in Item (73), under "Assignee", in Column 1, Lines 1-2, delete "Empire Technology Development LLC, Wilmington, DC (US)" and insert -- Empire Technology Development LLC, Wilmington, DE (US) --, therefor.

Signed and Sealed this
Twenty-sixth Day of July, 2016

Michelle K. Lee
*Director of the United States Patent and Trademark Office*